United States Patent [19]

Brumlik

[11] 3,808,646
[45] May 7, 1974

[54] MULTI-ELEMENT SELF-GRIPPING CHANNEL

[76] Inventor: George C. Brumlik, 154 Upper Mountain Ave., Montclair, N.J. 07042

[22] Filed: Mar. 18, 1971

[21] Appl. No.: 125,591

[52] U.S. Cl. ................... 24/87 R, 24/204, 85/17
[51] Int. Cl. ................... A44b 9/00, F16b 15/06
[58] Field of Search ............... 16/16; 85/11, 13, 17; 24/87 R, 204

[56] References Cited
UNITED STATES PATENTS

| 422,198 | 2/1890 | Forster | 85/17 |
| 634,196 | 10/1899 | Blackman | 24/87 R X |
| 1,187,518 | 6/1916 | Frost et al. | 85/13 X |
| 1,438,575 | 12/1922 | Brown | 85/13 UX |
| 2,433,914 | 1/1948 | Lang | 85/17 |
| 2,821,714 | 2/1958 | Kent et al. | 16/16 X |
| 3,618,447 | 11/1971 | Goins | 85/13 X |

FOREIGN PATENTS OR APPLICATIONS

| 4,216 | 8/1901 | Great Britain | 85/17 |
| 414,583 | 8/1946 | Italy | 85/17 |
| 746,287 | 3/1956 | Great Britain | 85/17 |

Primary Examiner—Donald A. Griffin
Attorney, Agent, or Firm—Edward F. Levy

[57] ABSTRACT

A multi-element self-gripping device is made in channel form with parallel rows of gripping members extending longitudinally along the edges of an elongated web or strip, and projecting perpendicularly from one face or both faces of the strip. The gripping members are formed with sharp hooks or barbs and provide a pair of parallel lines for penetration of an opposing surface.

10 Claims, 10 Drawing Figures

PATENTED MAY 7 1974 3,808,646

INVENTOR.
GEORGE C. BRUMLIK
BY Edward F. Levy
ATTORNEY

MULTI-ELEMENT SELF-GRIPPING CHANNEL

The present invention relates to improvements in multi-element self-gripping devices used to fasten together opposed articles, and in particular to an elongated, linear device of this type made in the form of a channeled strip.

In my prior U.S. Pat. Nos. 3,494,006 and 3,522,637, there is disclosed various types of self-gripping assemblies having a series of fastening elements provided with hooks or barbs, and so arranged that when the assembly is mounted on one article and is pressed against an opposing article, the fastening elements penetrate the surface of the opposing article and grip the latter in a self-adhering action. In the aforementioned U.S. Pat. No. 3,552,637, the self-gripping device is of the linear type, specifically being made in the form of an elongated filament with a series of sharp-edged hooks spaced therealong.

While the aforementioned devices are effective in their self-gripping fastening function, some difficulty may be encountered in penetrating dense surfaces because the hooked or barbed fastening elements are normally distributed over a relatively large surface area. Therefore when pressure is applied to force the fastening elements through a resisting surface, the force is distributed over an area of elements and is dissipated thereby.

The principle object of the present invention is to overcome this difficulty by arranging the fastening elements in parallel rows along opposite edges of an elongated strip or web, to provide a channel shaped device. Application of force centrally upon the web will distribute the force evenly along the two parallel lines of gripping elements for greatly improved penetration of the latter.

Another object of the invention is the provision of a self-gripping channel device of the character described which is constructed so as to be easily and conveniently mounted on an article with the fastening elements automatically arranged in proper orientation for penetration of an opposed surface.

Still another object of the invention is the provision of a self-gripping channel device of the character described, which lends itself to fabrication in a few easy steps by available machinery, and which is economical in manufacture.

In accordance with the invention there is provided a multi-element self-gripping device in the form of a channel comprising an elongated strip having a row of spaced gripping members extending longitudinally along each edge thereof and disposed perpendicularly to at least one surface of said strip to form a channel. Each of the gripping members have sharp gripping elements formed thereon and adapted to grip an opposed surface when the channel is pressed thereagainst. The rows of gripping members on the edge of the strip may project perpendicularly from opposite faces of the strip to provide self-gripping surfaces on both faces of the strip.

The gripping members may be formed integrally with the strip or may be formed as separate elements and secured at the edges of the strip. The device is initially formed as a flat unit with the gripping members in the same plane as the strip, and the gripping members are then bent perpendicularly to the strip.

Additional objects and advantages of the invention will become apparent in the course of the following specification when taken in connection with the accompanying drawings, in which.

Figure 1:
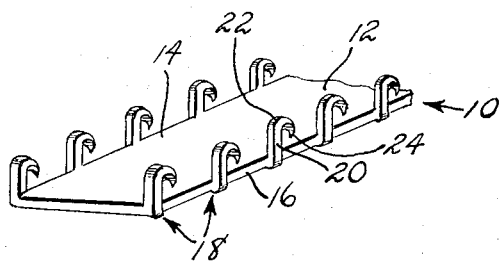
FIG. 1 is a perspective view of a self-gripping channel device made in accordance with the invention, with a pair of rows of gripping elements projecting from one face thereof.

Referring in detail to the drawings, there is shown in FIG. 1 a multi-element self-gripping channel device 10 made in accordance with the present invention. The device 10 comprises a web 12 having parallel side edges 14, 16 from each of which projects a row of spaced gripping elements or members 18.

In the form shown in FIG. 1, the web 12 and gripping elements 18 are formed integrally from a single blank of material. The web 12 is made in the form of an elongated strip which is preferably flexible, and may be made of plastic, metal, or other suitable material. The gripping members 18 have shanks 20 projecting perpendicularly from the upper face of web 12 and terminating in hooks 22 having sharp end edges 24.

If the channel device 10 is made of a plastic material, the device may be molded initially in its finished form sown in FIG. 1. However, in the preferred form of the invention, the device is formed from a flat blank such as the blank 26 shown in FIG. 4. This blank 26 is formed from a ribbon or length of plastic or metal, which is subjected to a stamping operating to provide the central web 12 having rows of spaced hooked gripping elements 18 projecting laterally from the opposite edges 14 and 16 of the web 12 but with the elements 18 aligned in the plane of the web. As an alternative, the blank 26 may be molded in the form shown in FIG. 4, with the elements 18 already projecting therefrom. In this form, the blank 26 may be made in lengths of several hundred feet, and wound on a reel for insertion into a machine which will bend the gripping members perpendicularly and attach the channel to an object.

Figure 5:
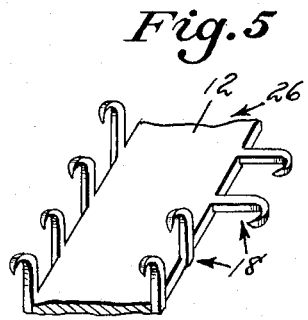
FIG. 5 is a perspective plan view of the blank of FIG. 4, showing some of the gripping elements bent upwardly in the formation of the self-gripping channel device of FIG. 1.

If the blank 26 is made of metal, the laterally extending members 18 are merely bent into upright position perpendicular to the plane of the web 12 to form the completed channel-shaped self-gripping device 10. FIG. 5 shows the blank 26 during the course of bending up the members 18. If the blank 26 is made of a thermoplastic material, the edge portions are first heated, the gripping members 18 bent upwardly, and the blank allowed to cool.

The flat central web 12 of the channel device 10 presents an area for mounting the device securely upon an object. For example, if the web 12 is plastic and is to be attached to a fabric, the web is laid flat upon the plastic and may be stitched thereto. The device may also be attached to rigid articles by rivetting, cementing, stapling or the like. In any event, the web 12 is secured flush against the surface of the article so that the gripping members 18 project perpendicularly from the article surface, presenting two parallel self-gripping lines. When the assembled article is then brought into engagement with the surface of an opposed article and pressed thereagainst, the projecting gripping members 18 will penetrate the surface of the opposed article and the hooks 22 will grip the latter.

It will be appreciated that the applied force in pressing together the two articles will be distributed evenly over the web 12, and then concentrated along the two lines of gripping members. This concentrated force provides optimum penetration of the gripping members into the opposed surface and also greatly increases the lateral peel strength of the attached device.

Figure 2:
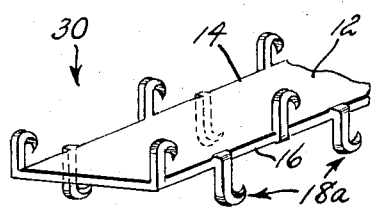
FIG. 2 is a perspective view of a self-gripping channel device similar to FIG. 1, but with rows of gripping elements projecting from both faces thereof.
Figure 4:
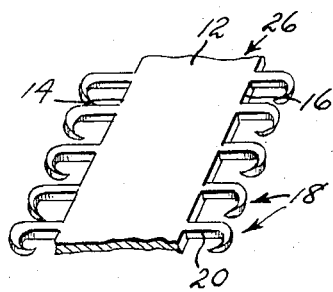
FIG. 4 is a perspective plan view of a blank employed to form the self-gripping channel devices of FIGS. 1 and 2.

FIG. 2 shows an alternate form of self-gripping channel device 30 which may molded in finished form, or may be formed from the blank 26 of FIG. 4. In this instance, along each longitudinal edge 14 and 16 of the web 12, a row of depending fastening elements 18a is provided in addition to the row of upstanding fastening elements 18. The device 30 thus is provided with rows of self-gripping members projecting perpendicularly from both of its faces. The web 12 may be mounted on a first article simply by pressing the web against the surface of the article until the depending rows of gripping members 18a penetrate and adhere, without the necessity for further attachment. The upstanding rows of gripping members 18 are then employed to attach an opposed article in the manner previously described.

In forming the double-channel device 30 of FIG. 2 from a blank 26 of the type shown in FIG. 4, it will be appreciated that on each side edge 14, 16 of the web 12, the laterally projecting members 18 are alternately bent upwardly and downwardly to provide the respective edge rows of upstanding gripping elements 18 and depending gripping elements 18a.

Figure 3:
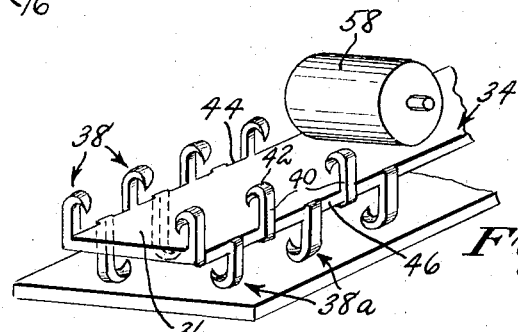
FIG. 3 is a perspective view of a self-gripping channel device similar to the one shown in FIG. 2, but showing a different type of gripping element with the hooks arranged in a different direction.

In FIG. 3 there is shown a modified type of self-gripping channel device 34 which has a central web 36 identical to the web 12, but in which the gripping members 38 are of different construction. In this embodiment the gripping members 38 again have shanks 40 projecting perpendicularly to the plane of web 36, but in this instance the shanks terminate in hooks 42 which face inwardly toward the center of web 36, that is to say the hooks 42 are disposed perpendicularly to the longitudinal axis of web 36 instead of being parallel thereto as in the previous embodiments.

The channel device 34 of FIG. 3 is shown as a double-channel device by way of illustration, although it may be formed as a single-channel device similar to that shown in FIG. 1, as will be presently described. The web 36 of device 34 has parallel side edges 44 and 46 along which are arranged parallel rows of upstanding fastening members 38 and in addition parallel rows of depending fastening members 38a. In both the upstanding and depending rows, the respective fastening elements 38 and 38a terminate in hook portions 42 which are disposed perpendicularly to the axis of the web and face the hooks of the opposite row.

Figure 6:
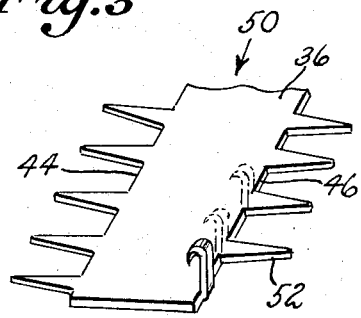
FIG. 6 is a perspective plan view of another type of blank which may be used to form the self-gripping channel device of FIG. 3.

FIG. 6 illustrates a blank 50 which may be employed in forming the channel device 34 of FIG. 3. The blank 50 may again be made of metal or plastic, and is stamped to form the central web 36 with rows of tapered arms 52 projecting from the longitudinal edges 44, 46 of the web. The arms 52 are provided with sharp ends or tips 54.

In forming the channel device, the laterally projecting arms 52 of blank 50 are bent perpendicularly to the plane of the web 36, and in the same operation, the pointed ends or tips 54 are turned over and curved to form the hooks 42 of the completed gripping members 38. The arms 52 of the blank 50 may be bent alternately upwardly and downwardly to provide the rows of upstanding gripping elements 38 and depending gripping elements 38a. As an alternative, all of the arms 52 of blank 50 may be bent perpendicularly upward, in the manner shown in FIG. 6, to provide a single channel device.

FIG. 3 also illustrates schematically the manner in which a completed double channel device may be mounted on the surface of an object. The web 36 of channel device is set in a selected position overlying an object 56 with the depending gripping members 38 resting on the surface of said object, and a roller 58 is pressed down upon the upper surface of web 36 and drawn along the length of the web. The downward force of the roller 58 is distributed along the width of the web and concentrated upon the opposed pairs of depending gripping members 38a in the vicinity of the roller, causing effective penetration of the gripping members into the surface of article 56. The roller 58 is of any suitable conventional type, but is of such width that it fits easily between the upstanding rows of gripping members 38 so that it will roll therebetween without engaging the upstanding gripping members.

Figure 7:
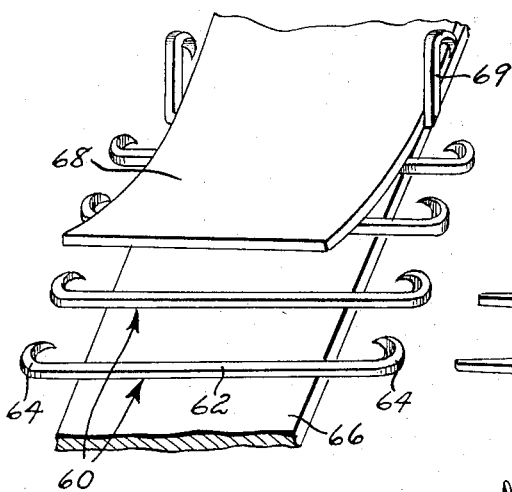
FIG. 7 is a perspective view illustrating the manner in which a self-gripping channel device of the type shown in FIGS. 1 and 2 may be formed from separate gripping members laminated between two layers of the web or strip.
Figure 8:
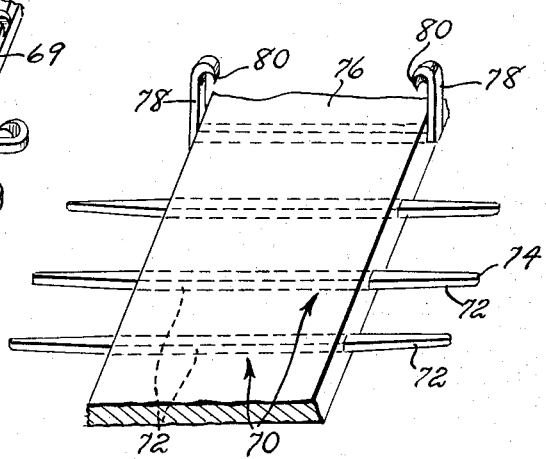
FIG. 8 is a perspective view showing a laminated slef-gripping channel device in an intermediate stage of formation utilizing separate gripping members of the type shown in FIGS. 3 and 6.

FIGS. 7 and 8 illustrate another manner in which channel devices of the types shown in FIGS. 1, 2 and 3 may be formed. In these embodiments, the gripping members are not made integrally with the web, but are formed separately and may be made of a material different from that of the web.

In FIG. 7 there is shown a plurality of elements 60 each comprising an elongated shank 62 formed at both ends with terminal hooks 64. These elements 60 are placed in a row upon the upper surface of a flexible strip 66 with each shank 62 extending perpendicularly to the axis of the strip 66 and the hooks 64 parallel to the strip axis and all facing in the same direction. The strip 66 is made of a width appreciably smaller than the length of shank 62 so that the hooked end portions of the elements 60 project beyond the side edges of the strip, as shown in FIG. 7.

After the elements 62 are properly set in spaced parallel arrangement upon the strip 66, a second strip 68 of identical width, is laid over the strip 66 and laminated thereto with the shanks of elements 60 sandwiched therebetween. This produces an assembly similar to the blank 26 of FIG. 4, that is with a row of hooked members projecting laterally from each edge of the laminated strips 66, 68 which now constitute a central web. The members are bent perpendicularly as shown at the top of FIG. 7 to provide hooked gripping members 69 projecting from one or both faces of the central web.

FIG. 8 shows a similar assembly, except that in this instance a plurality of elements 70 are provided, each element 70 having an elongated shank 72 terminating at each end in tapered pointed tips 74 which resemble the arms 52 of the blank 50 shown in FIG. 3. In addition, the strip 76 is not laminated, but instead is molded or extruded of plastic material with the element shanks 72 embedded therein. The strip 76 thus forms a central web with a row of pointed arms 78 projecting laterally from each edge thereof, which resembles the blank 50 of FIG. 6. The projecting arms 78 are bent perpendicularly and the tips 74 curved over to form gripping members 80 with inwardly facing hooks 82 as shown in FIG. 8.

In the embodiments of FIGS. 7 and 8, the elements 60 or 70 may be made of metal, and the webs or strips made of plastic. Since the elongated shanks 62, 72 extend transversely through the web, individual pressure may be applied to each of pair of connected gripping members by pressing against the elongated shank connecting said pair of members.

Figure 9:
FIGS. 9 and 10 are enlarged views of different types of gripping elements which may be included in the self-gripping channel devices of the invention.
Figure 10:

FIGS. 9 and 10 illustrate other forms in which the gripping members, of any of the embodiments shown herein, may be made. As shown in FIG. 9, a gripping member 84 may be provided with a terminal gripping portion in the shape of an arrow head 86 instead of the hooks previously described. As an alternate form, the gripping member 88 shown in FIG. 10 may be provided with one or more barbs 90 arranged along its shank.

While preferred embodiments of the invention have been shown and described herein, it is obvious that numerous omissions, changes and additions may be made in such embodiments without departing from the spirit and scope of the invention.

What is claimed is:

1. A multi-element self-gripping channel device for releasably gripping an opposed article, said device comprising an elongated, flexible web in the form of a flexible plastic strip having parallel longitudinal edges and a plurality of closely-spaced gripping members arranged in rows only along both longitudinal edges of said web, said members having stems extending substantially perpendicularly from at least one face of said web to form said channel, each of said stems having sharp gripping portions formed thereon and arranged to penetrate and grip a surface of said opposed article when said channel device is pressed thereagainst, said gripping portions having gripping surface extending angularly to the axis of said stems, whereby said gripping portions are operative to lodge in said article and grip said article in a self-adhering action.

2. A multi-element self-gripping channel device according to claim 1 in which said gripping members are integral with said web.

3. A multi-element self-gripping channel device according to claim 1 in which said gripping members are formed separately from said web and made of a material different from that of the web.

4. A multi-element self-gripping channel device according to claim 1 in which the gripping portions of said gripping members are barbs arranged along the shanks of said members.

5. A multi-element self-gripping channel device according to claim 1 in which the gripping portions of said gripping members are terminal hooks.

6. A multi-element self-gripping channel device according to claim 5 in which said hooks are disposed in a direction parallel to the axis of said web.

7. A multi-element self-gripping channel device according to claim 6 in which said hooks are disposed in a direction perpendicular to the axis of said web.

8. A multi-element self-gripping channel device according to claim 1 in which each of the said gripping members in one of said rows is connected to an aligned member in the opposite row by an elongated shank extending transversely across said web and embedded therein.

9. A multi-element self-gripping channel device according to claim 8 in which said web is formed of two flexible strips laminated together with the elongated shanks of said gripping members sandwiched therebetween.

10. A multi-element self-gripping channel device according to claim 1 in which a first pair of rows of gripping members extend perpendicularly from one face of said web to form a first channel, and a second pair of gripping members extend perpendicularly from the opposite face of said web to form a second channel facing in the opposite direction from said first channel.

* * * * *